W. WENDERHOLD.
ELECTRICAL CONNECTION CLAMP.
APPLICATION FILED DEC. 1, 1917.

1,437,209.

Patented Nov. 28, 1922.

Inventor
William Wenderhold

Patented Nov. 28, 1922.

1,437,209

UNITED STATES PATENT OFFICE.

WILLIAM WENDERHOLD, OF NEW YORK, N. Y., ASSIGNOR TO CRU PATENTS CORPORATION, A CORPORATION OF NEW YORK.

ELECTRICAL CONNECTION CLAMP.

Application filed December 1, 1917. Serial No. 205,000.

*To all whom it may concern:*

Be it known that I, WILLIAM WENDERHOLD, a citizen of the United States, residing at New York city, in the county and State of New York, have invented certain new and useful Improvements in Electrical Connection Clamps, of which the following is a clear, full, and exact description.

The object of my invention is to provide a connection clamp for carbon holders and electric terminals that will maintain positive electrical contact, especially where such connections are subject to heat.

Referring to my drawings.

Figure 1:
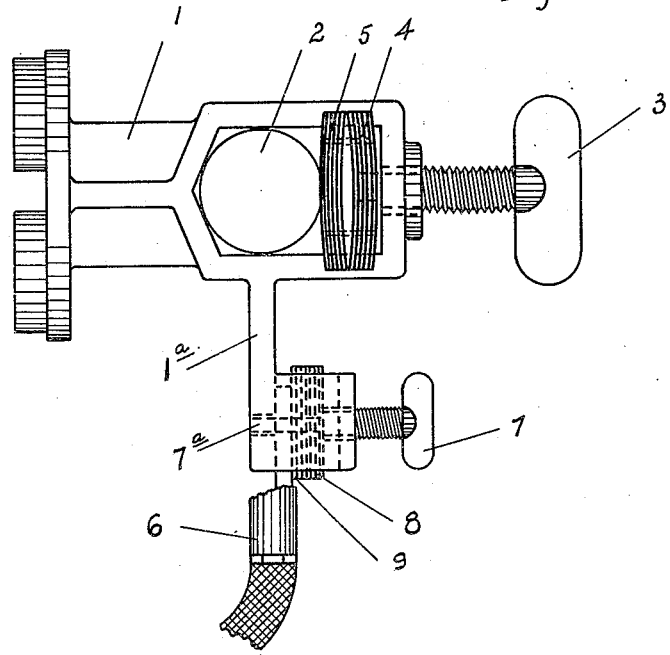
Fig. 1 is a top view of a carbon holder showing the improved electrical connection.

As shown in Fig. 1, the bracket 1 is a carbon holder such as usually used in arc-lamps, having an extension 1ª for wire connection. The carbon 2 is held in bracket 1 by means of a screw 3 which presses the thermostatic members or blocks 4 and 5 against the carbon 2. The action of thermostatic metal is well known. Blocks 4 and 5 when heated have a tendency of curving as shown in the drawing, thereby bringing more pressure upon the carbon 2, and also taking up any expansion that might take place in the bracket 1 caused by the heating of said bracket. The action in the extension 1ª is similar.

Figure 2:
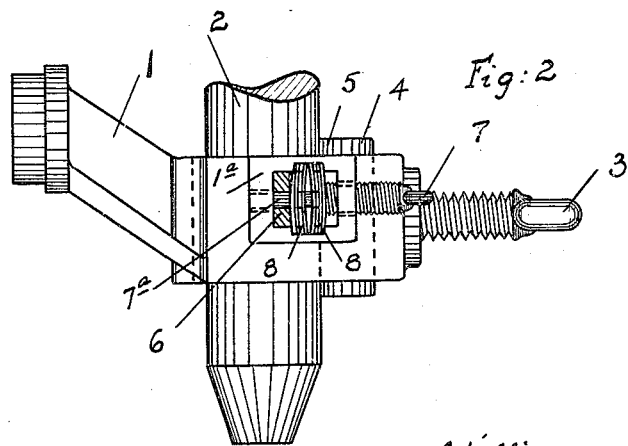
Fig. 2 is a side view thereof, partly in cross-section.

The wire terminal 6 is held in the bracket extension 1ª. The screw 7 has a stud extremity 7ª which passes through the terminal 6. The thermostatic blocks 8 and 9 are pressed against the terminal 6 by the screw 7. When heated they also have a tendency to curve as shown in Fig. 2, thereby putting more pressure on the terminal 6. Thus it will be seen that positive connection can be maintained even under extreme heat conditions.

The bracket 1 as illustrated is a carbon holder as employed in arc lamps. My invention can be employed wherever it is found difficult to maintain good electrical connection on account of heat.

While I have shown and described a specific structure embodying the principles of my invention, I wish it to be understood that my invention in its broad scope as defined by the claims is not to be limited or restricted thereto, as many changes in details of construction will readily appear to those skilled in the art without departing from the contemplated spirit and scope of my invention.

What I claim as my invention is:

1. A clamping means for electric connections, comprising a holding bracket for engaging an electric conductor, adjusting means on said bracket and a pair of curved cooperating thermostatic members movably mounted in said bracket between said conductor and said adjusting means for increasing the tensioning action on the conductor with increase of temperature.

2. In a thermostatic holder for clamping an electric conductor, a main bracket for holding said conductor, an adjusting screw in said bracket and a pair of concave thermostatic members in said holder between said conductor and said adjusting screw, whereby when temperature varies the concavity of said thermostatic members varies to thereby vary the clamping action on said conductor.

Signed at the city of New York, New York, this 24th day of November one thousand nine hundred and seventeen.

WILLIAM WENDERHOLD.